United States Patent [19]

Yamabe et al.

[11] 4,426,100
[45] Jan. 17, 1984

[54] AUTOMOTIVE VEHICLE TOW DEVICE

[75] Inventors: Masao Yamabe; Masaaki Uchiyama, both of Tokyo, Japan

[73] Assignee: Nissan Motor Co., Ltd., Yokohama, Japan

[21] Appl. No.: 183,773

[22] Filed: Sep. 3, 1980

[51] Int. Cl.³ .............................................. B60D 1/04
[52] U.S. Cl. ................................. 280/770; 280/480; 410/23
[58] Field of Search ............... 280/762, 480, 770; 296/204; 410/10–12, 21, 85, 108, 109, 110; 105/462; 24/230.5 R, 116 R; 59/78, 95, 93; 114/230, 249, 253

[56] References Cited

U.S. PATENT DOCUMENTS

| | | |
|---|---|---|
| 994,865 | 6/1911 | Morris et al. ............... 24/116 R |
| 2,222,393 | 11/1940 | Benjamin ............... 24/116 R X |
| 2,593,645 | 4/1952 | Amey ............... 280/480 X |
| 2,770,198 | 11/1956 | Blomberg ............... 410/108 |
| 2,834,608 | 5/1958 | Wixson ............... 280/767 |
| 2,970,850 | 2/1961 | Blunden ............... 410/23 |
| 3,350,064 | 10/1967 | Blume ............... 24/116 R X |
| 3,351,356 | 11/1967 | Clark et al. ............... 410/110 |

FOREIGN PATENT DOCUMENTS

| | | |
|---|---|---|
| 532771 | 11/1956 | Canada ............... 410/108 |
| 1823633 | 10/1960 | Fed. Rep. of Germany . |
| 1949557 | 8/1966 | Fed. Rep. of Germany . |
| 50-39541 | 11/1975 | Japan . |

OTHER PUBLICATIONS

1979 Honda Accord, illustration of towing device.
Datsun B210 Service Manual, 1975, p. GI-6, ©1974.

Primary Examiner—Joseph F. Peters, Jr.
Assistant Examiner—Michael Mar
Attorney, Agent, or Firm—Schwartz, Jeffery, Schwaab, Mack, Blumenthal & Koch

[57] ABSTRACT

A tow device is mounted between two structural members of a vehicle which share in absorbing a moment of force transmitted through the device when the vehicle is towed. One of the structural members is substantially normal to the axis about which the moment of force acts to provide resistance to structural deformation, while permitting the device to project below the vehicle body proper to prevent accidental impacting of the vehicle underbody on the road.

19 Claims, 8 Drawing Figures

AUTOMOTIVE VEHICLE TOW DEVICE

BACKGROUND OF THE INVENTION

1. Field of the Invention

The present invention relates generally to an automotive vehicle body construction and more specifically to a tow device thereof which features increased structural strength and which serves to protect the lowermost components of the vehicle with accidental impact against the road surface.

2. Description of the Prior Art

In a known arrangement, a hook or the like has been welded or otherwise fixedly secured to an essentially horizontal vehicle underpanel at a location above the lowermost level of the vehicle bottom. This arrangement has suffered from a number of drawbacks, such as impaired accessibility and susceptibility to buckling or other deformation upon the application of an excessive load when a cable or similar device is connected to the hook.

In an effort to overcome these problems it has been hitherto proposed to increase the thickness and strength of the panel to which the hook is attached and/or to add a reinforcing member to the existing panel to locally reinforce same against the aforementioned buckling. While these measures have to some extent solved the problem, they have inherently added undesirable weight and cost to the vehicle.

SUMMARY OF THE INVENTION

The present invention features a tow device disposed between and fixedly connected to two panels defining part of the vehicle structure. At least one of the panels has a wall section essentially perpendicular to the vehicle underpanel and parallel to the longitudinal axis thereof. The tow device is affixed to this wall section so that upon application of a large moment of force to the tow device, the buckling phenomenon exhibited by prior art constructions is resisted by the orientation of the wall section with respect to the axis about which the moment of force acts and by the distribution of the moment through two panels rather than through a single panel to an interconnected adjacent panel. The increased resistance to buckling under relatively large force moments permits the tow device to simultaneously perform a protective function by projecting below the lowermost portion of the vehicle body (such as the fuel tank and the exhaust pipe) to prevent impacting of the vehicle bottom on the road surface should the wheel or wheels enter pot holes or the like in the road.

Additional objects, advantages and novel features of the invention will be set forth in the description which follows and in part will become apparent to those skilled in the art upon examination of the following or may be learned by practice of the invention.

BRIEF DESCRIPTION OF THE DRAWINGS

The features and advantages of the tow device according to the present invention will be more clearly appreciated from the following description taken in conjunction with the accompanying drawings in which like reference numerals designate corresponding elements, and in which.

DETAILED DESCRIPTION OF THE INVENTION

Figure 1:
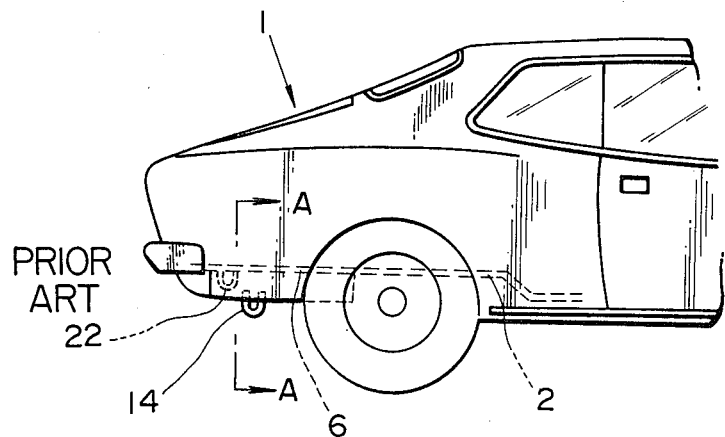
FIG. 1 is a view of the rear half of an automobile showing the disposition of a device according to the present invention as well as (in broken line) of the prior art arrangement.
Figure 2:
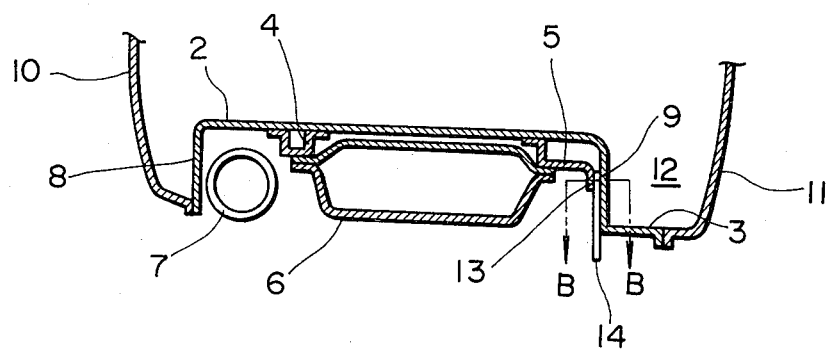
FIG. 2 is a sectional view taken along section line A—A of FIG. 1.
Figure 3:
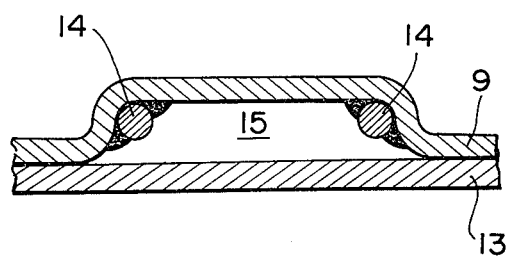
FIG. 3 is a sectional view taken along section line B—B of FIG. 2.

Turning now to the drawings and more specifically to FIGS. 1, 2 and 3, a first embodiment of the tow device of the present invention is illustrated. A vehicle 1 has a structural panel 2, which in this case defines the floor of the vehicle trunk. The structural panel 2 is reinforced by longitudinally extending structural members 4 and 5, which have substantially channel shaped cross sections. A fuel tank 6 is mounted between the structural members 4 and 5, and an exhaust pipe 7 is mounted to the vehicle adjacent the fuel tank.

The structural panel 2, defining the floor of the trunk (or floor panel as it will be referred to hereinafter), is formed with perpendicular wall sections 8 and 9, which mate with external body panels 10 and 11. The perpendicular wall section 9, as illustrated, is further formed with an essentially horizontal section 3 which mates with the external body panel 11 to define a spare tire well 12 or the like. As best shown in FIGS. 2 and 3, the first embodiment of the tow device 14 of the present invention is sandwiched between a downwardly depending flange 13 of the channel member 5, and the perpendicular wall section 9, and is fixedly connected to one or both by welding or the like. In the first embodiment, the tow device takes the form of a simple U-shaped bar, the ends of which are welded in an appropriately shaped recess 15 formed into either or both of said wall section 9 and said flange 13. In FIG. 3, the recess 15 is shown to be formed in the perpendicular wall section 9.

The second embodiment of the present invention is illustrated in FIGS. 4 to 8. This embodiment differs from the first in that the U-shaped bar 14, is initially fixed (by welding or the like) to a base plate or structural attachment member 16. The structural attachment member 16 is formed with a flat section 17 and a raised section 18. The raised section 18 is interposed between the ends of the U-shaped member 14 which are, in the illustrated embodiment, welded to both the raised and flat sections.

Figure 4:
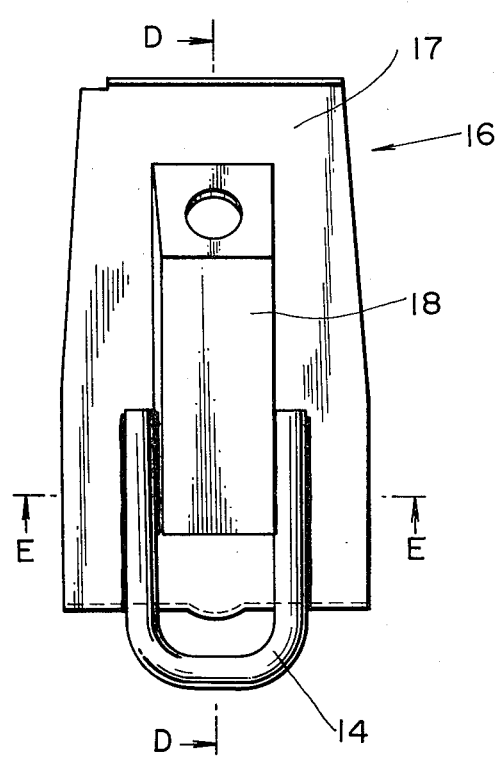
FIG. 4 is a front elevation of a second embodiment of the present invention.
Figure 5:
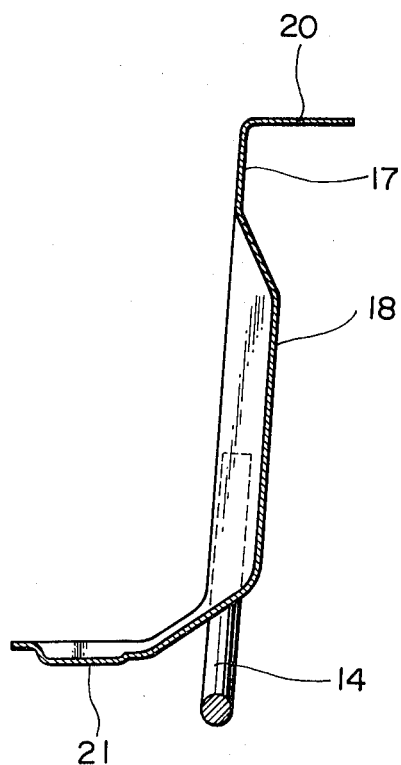
FIG. 5 is a sectional view taken along section line D—D of FIG. 4.
Figure 6:
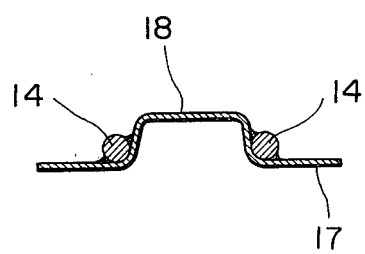
FIG. 6 is a sectional view taken along section line E—E of FIG. 4.
Figure 7:
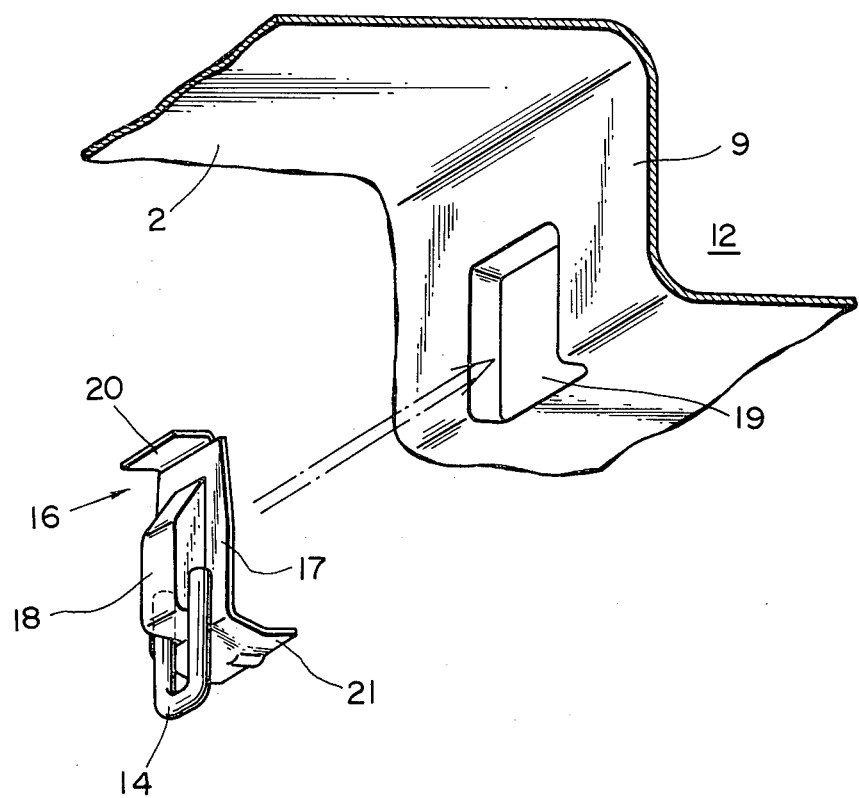
FIG. 7 is an exploded perspective view showing the second embodiment the present invention and a recess formed in the vertical panel in which the device is mounted.
Figure 8:
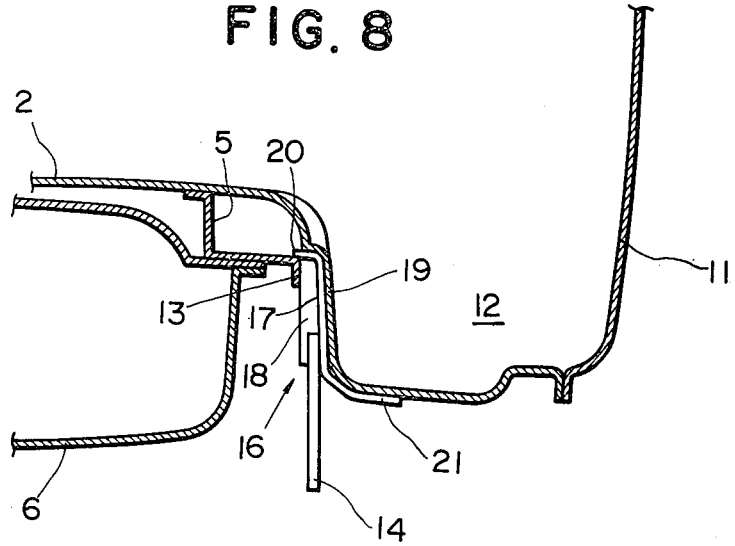
FIG. 8 is a sectional view of the arrangement shown in FIG. 7.

While the arrangement illustrated in FIGS. 4 to 6 could be easily attached to a flat surface of the perpendicular wall section 9, it is preferred to additionally form a recess 19 in the perpendicular wall section 9 for receiving the structural attachment member 19 therein. The attachment member 16 is formed with flanges 20 and 21 which respectively contact the inner top edge of the recess 19 and the bottom of the spare tire well 12. In the instance where the recess is not provided, it is possible to seat the the flange 20 against the inner surface of the longitudinally extending structural member 5.

Thus, in the second embodiment of the tow device, the U-shaped bar 14 is fixed initially to the base plate (structural attachment member) 16, and the combination is then fixed in the recess 19. In this manner, locating the tow device during production is facilitated, and outstanding structural rigidity results. A loading force on the U-shaped bar 14 acts essentially parallel to the vehicle's longitudinal axis, resulting in a force moment about an axis essentially normal thereto tending to rotate the bar and attachment member 16. Due to the construction of the attachment member 16 including the raised section 18 and the perpendicular wall section 9 including the recess 19, the structural integrity of the wall section is greatly increased, thereby preventing the wall section 9 and the structural member flange 13 from buckling even under extreme conditions of excessive loading forces.

Accordingly, due to its inherent resistance to deformation, the two device projects as illustrated in FIG. 1, below the lowermost level of the vehicle body (in contrast with the prior art arrangement 22 illustrated in broken lines in FIG. 1) to define a definite degree of protection of the vehicle components such as the fuel tank 6 and exhaust pipe 7, in the event the vehicle should bottom out on its suspension due to various road conditions.

Thus, with the disclosed embodiments of the present invention it will be appreciated that without the need for increasing the thickness and strength of material from which the members such as the structural member 5 are formed, and without the need for any additional reinforcement panels, the present invention provides sufficient structual strength and rigidity to permit the tow device to serve as both a tow device and a protective device.

Further, it will be appreciated that the present invention is not limited to the rear of the vehicle and can be applied to front of same with equal effect.

The foregoing description of the preferred embodiments of the invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In an automotive vehicle, a structure comprising:
   a structural panel extending to adjacent the end of the vehicle, said panel having a wall section substantially perpendicular thereto;
   a longitudinally extending structural member securely attached to said structural panel;
   a tow device comprising a U-shaped bar having two ends for receiving a cable or the like; and
   means for securely attaching said tow device to at least one of said perpendicular wall section and said structural member, said attaching means being interposed between said perpendicular wall section and said structural member and having a structural attachment comprising:
   a flat section attached to said perpendicular wall section; and
   a raised section interposed between the two ends of said U-shaped bar and securely attached to said U-shaped bar.

2. A structure as claimed in claim 1, wherein said device extends below the bottommost elements of the vehicle body.

3. A structure as claimed in claim 1, wherein said perpendicular wall section includes a recess therein for receiving said structural attachment member.

4. A structure as claimed in claim 1, wherein said attachment member further comprises a first flange essentially perpendicular to said flat section for attaching to a mating section of said structural panel adjacent said perpendicular wall section.

5. A structure as claimed in claim 1, wherein said attachment member further comprises a second flange essentially perpendicular to said flat section for attaching to said longitudinally extending structural member.

6. A tow apparatus as claimed in claim 1 wherein said attaching means comprises a welded mounting.

7. A tow apparatus as claimed in claim 1 wherein said attaching means comprises a structural attachment member affixed to at least one of said perpendicular wall section and said structural member, said tow device affixed to said structural attachment member.

8. In a vehicle, a structure comprising:
   a horizontally extending structural panel having a wall section extending perpendicular to said panel and extending substantially parallel to the longitudinal axis of the vehicle body;
   a longitudinally extending structural member securely fixed to said panel and located adjacent to said perpendicular wall section; and
   a tow device comprising a U-shaped bar fixedly secured to a base plate which is connected to said structural member and positioned in the vicinity of an end of said vehicle body, and means for securely attaching said tow device to at least one of said perpendicular wall sections and said structural member, said attaching means being interposed between said perpendicular wall section and said structural member, said two device projecting below the level of the bottom of the vehicle body for protecting said body against impact with a surface upon which the vehicle is driven.

9. A vehicle structure as claimed in claim 8, further comprising means defining a recess in said perpendicular wall section for receiving therein said base plate.

10. A vehicle structure as claimed in claim 9, wherein said base plate comprises a flat section having a raised section formed therein, said raised section being dimensioned to be snugly received between the ends of said U-shaped bar.

11. A vehicle structure as claimed in claim 10, wherein said base plate has first and second flanges, said first flange being attached to said recess and said elongate structural member, said second flange being attached to a mating section of said panel adjacent said perpendicular wall section.

12. In a vehicle having a body,
   a structural panel, positioned essentially horizontally with respect to the body of the vehicle, said structural panel having a wall section perpendicular thereto which extends substantially parallel to the longitudinal axis of the vehicle body, said perpendicular wall section being formed with a recess;

a longitudinally extending structural member securely fixed to said panel and located adjacent said perpendicular wall section; and a device in the form of a U-shaped bar having two ends interposed between said perpendicular wall section and said longitudinally extending structural member and fixedly connected to a wall of said recess in a manner that said two ends are essentially aligned with said longitudinal axis, said device being disposed near an end of said vehicle and arranged to project below the lowermost level of the body of the vehicle to thereby prevent impact between the elements defining said lowermost level and a surface on which the vehicle is driven and for attaching a tow cable or the like to the vehicle.

13. A vehicle as claimed in claim 12 wherein said vehicle is equipped with road wheels operatively connected to the body of the vehicle and a bumper mounted at one end of said vehicle body, said device being disposed between said bumper and said road wheels.

14. In combination, a motor vehicle having a vehicle body, structural frame members, a tow apparatus, and means for mounting and securing said tow apparatus to one of said structural frame members, said combination comprising:

(a) said tow apparatus being a substantialy U-shaped bar, the curved portion of said U-shaped bar forming a tow line aperture adapted to be engaged by a tow line, the two straight portions of said U-shaped bar forming two bar arms;

(b) one of said structural frame members having a recess formed therein at a location between the vehicle rear bumper and the vehicle rear wheels, said recess having upper and lower open ends, said recess having a major longitudinal dimension and a minor lateral dimension;

(c) said tow apparatus being positioned in said frame member recess, said two bar arms being vertical and lying in a longitudinally extending plane, the axis of said tow line aperture being horizontal and laterally extending; and (d) means for mounting and securing said two bar arms in said recess, the curved portion of said U-shaped bar extending below said vehicle body and said structural frame members to protect same against contacting the surface upon which the vehicle is driven.

15. The combination of claim 14 wherein said mounting and securing means includes a welded attachment.

16. In combination, a motor vehicle having a vehicle body, structural frame members, a tow apparatus, and means for mounting and securing said tow apparatus to one of said structural frame members, said combination comprising:

(a) said tow apparatus being a substantially U-shaped bar, the curved portion of said U-shaped bar forming a tow line aperture adapted to be engaged by a tow line, the tow straight portions of said U-shaped bar forming two bar arms;

(b) one of said structural frame members having a mounting location between a vehicle bumper and adjacent vehicle wheels, said mounting location lying on a vertical longitudinally extending plane;

(c) a structural attachment plate having a protruding portion, said tow apparatus being mounted and secured to said structural attachment plate with said bar arms straddling said protruding portion;

(d) said structural attachment plate being positioned against said structural frame member mounting location, said two U-shaped bar arms lying in a longitudinally extending plane, the axis of said tow line aperture being horizontal and laterally extending; and (e) means for mounting and securing said structural attachment plate to said structural frame member mounting location, the curved portion of said U-shaped bar extending below said vehicle body and said structural frame members to protect same against contacting the surface upon which said vehicle is driven.

17. The combination of claim 16 wherein said U-shaped bar arms are welded to said structural attachment plate.

18. The combination of claim 16 wherein said structural attachment plate is welded to said structural frame member mounting location.

19. The combination of claim 16 wherein said structural attachment plate has an upper horizontal portion, an intermediate vertical portion, and a lower horizontal portion, all of said portions being mounted against corresponding mounting location surfaces on said structural frame members.

* * * * *

UNITED STATES PATENT AND TRADEMARK OFFICE
CERTIFICATE OF CORRECTION

PATENT NO. : 4,426,100

DATED : January 17, 1984

INVENTOR(S) : Masao YAMABE et al

It is certified that error appears in the above-identified patent and that said Letters Patent is hereby corrected as shown below:

On the cover page, column 1, after item [22], should read:

--[30]  Foreign Application Priority Data
    Sept. 3, 1979 [JP]   Japan............. 54-111654--

Signed and Sealed this

Twenty-fourth Day of April 1984

[SEAL]

Attest:

GERALD J. MOSSINGHOFF

Attesting Officer     Commissioner of Patents and Trademarks